United States Patent
Unger et al.

(10) Patent No.: US 7,624,351 B2
(45) Date of Patent: Nov. 24, 2009

(54) METHODS AND APPARATUS FOR CONTROLLING A PLURALITY OF APPLICATIONS

(75) Inventors: Joseph J. Unger, Encinitas, CA (US); Mark K. Dillon, Poway, CA (US); Edmund D. Mesterharm, Oceanside, CA (US)

(73) Assignee: Verizon Corporate Services Group Inc., Basking Ridge, NJ (US)

( * ) Notice: Subject to any disclaimer, the term of this patent is extended or adjusted under 35 U.S.C. 154(b) by 617 days.

(21) Appl. No.: 10/261,593

(22) Filed: Oct. 2, 2002

(65) Prior Publication Data
US 2003/0071851 A1   Apr. 17, 2003

Related U.S. Application Data

(60) Provisional application No. 60/326,229, filed on Oct. 2, 2001.

(51) Int. Cl.
*G06F 3/00* (2006.01)
*G06F 9/00* (2006.01)
*G06F 17/00* (2006.01)

(52) U.S. Cl. ............ 715/763; 715/762; 715/764; 715/765; 715/779; 715/781; 715/810; 715/835; 715/864

(58) Field of Classification Search ............ 715/841, 715/853, 810, 835, 779, 804, 781, 845, 864, 715/762, 718
See application file for complete search history.

(56) References Cited

U.S. PATENT DOCUMENTS

| | | | | |
|---|---|---|---|---|
| 5,721,853 | A * | 2/1998 | Smith | 715/803 |
| 5,737,557 | A * | 4/1998 | Sullivan | 715/765 |
| 5,874,958 | A * | 2/1999 | Ludolph | 715/781 |
| 5,973,666 | A * | 10/1999 | Challener et al. | 715/810 |
| 6,012,113 | A * | 1/2000 | Tuckner | 710/64 |
| 6,239,798 | B1 * | 5/2001 | Ludolph et al. | 715/788 |
| 6,918,091 | B2 * | 7/2005 | Leavitt et al. | 715/765 |
| 2001/0028369 | A1 * | 10/2001 | Gallo et al. | 345/848 |
| 2003/0174172 | A1 * | 9/2003 | Conrad et al. | 345/781 |

* cited by examiner

*Primary Examiner*—Tadesse Hailu
*Assistant Examiner*—Anita D Chaudhuri

(57) ABSTRACT

Methods and apparatus are provided to control a plurality of applications on a computer having a graphical user interface using a control application installed in addition to an operating system of the computer. An object, representing the control application and having a first sensitive area, is displayed within the graphical user interface. A first user input is received at the first sensitive area on the object. A window slides from the object and includes a plurality of icons corresponding to the plurality of applications while the first sensitive area continues to be displayed. A second user input is received in the window corresponding to at least one of the plurality of icons. At least one of the applications is then controlled based on the second user input.

3 Claims, 14 Drawing Sheets

METHODS AND APPARATUS FOR CONTROLLING A PLURALITY OF APPLICATIONS

CROSS REFERENCE TO RELATED APPLICATION

This application claims the benefit of U.S. Provisional Patent Application No. 60/326,229, entitled "CONTROL PAD," filed on Oct. 2, 2001, the disclosure of which is expressly incorporated herein by reference in its entirety.

FIELD OF THE INVENTION

The principles of the present invention relate to a user interface. More particularly, the principles of the present invention relate to methods and apparatus to provide a user interface for a plurality of applications.

BACKGROUND OF THE INVENTION

Today, most operating systems provide a graphical user interface for users to control programs on a computer. For example, operating systems, such as Microsoft Windows™ and Apple Macintosh™, often provide "windows" and icons to control each program on a computer, e.g., by using a mouse to "point and click." As a result, typical user interfaces use a variety of windows and icons to control each program.

Unfortunately, typical user interfaces become very complex as the number of programs on a computer increase. Recent advances in technology have allowed a dramatic increase in the number of programs that can be supported on a computer. Moreover, the number of programs executed on a computer has increased dramatically with the popularity of applications supported over the Internet. For example, it is now common for users to operate a wide variety of programs, including: word processing; games, electronic mail; instant messaging; network or online applications; multi-media applications; etc. Therefore, it would be desirable to coordinate the wide variety of programs supported by a computer.

SUMMARY OF THE INVENTION

In accordance with the principles of the present invention, a plurality of applications on a computer having a graphical user interface are controlled using a control application installed in addition to an operating system of the computer. An object, representing the control application and having a first sensitive area, is displayed within the graphical user interface. A first user input is received at the first sensitive area on the object. A window slides from the object and includes a plurality of icons corresponding to the plurality of applications while the first sensitive area continues to be displayed. A second user input is received in the display area corresponding to at least one of the plurality of icons. At least one of the applications is then controlled based on the second user input.

In accordance with another aspect of the present invention, a device comprises a display and a processor. The processor interfaces the display based on an operating system and a graphical user interface. In addition, the processor is configured to display an object, representing a control application installed in addition to the operating system and having a first sensitive area, within the graphical user interface. A first user input is received at the first sensitive area on the object. The object is expanded to display an area having a plurality of icons corresponding to a plurality of applications while the first sensitive area continues to be displayed. A second user input is received in the display area corresponding to at least one of the plurality of icons, and at least one of the applications is controlled based on the second user input.

It is to be understood that both the foregoing general description and the following detailed description are exemplary and explanatory only and are not restrictive of the present invention.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE EMBODIMENTS

The principles of the present invention provide a user interface for controlling, interfacing, and executing a plurality of applications on a computer. The computer may be executing the applications locally or with the assistance of another computer online over a network, such as the Internet.

In one embodiment, a "control pad" icon or object is displayed by the computer to provide a central interface to control, interface, or execute a plurality of applications. The control pad may organize the applications into one or more sets based upon a variety of parameters, such as user information or application type.

Reference will now be made in detail to the present exemplary embodiments of the invention, examples of which are illustrated in the accompanying drawings. Wherever possible, the same reference numbers will be used throughout the drawings to refer to the same or like parts.

Figure 1:
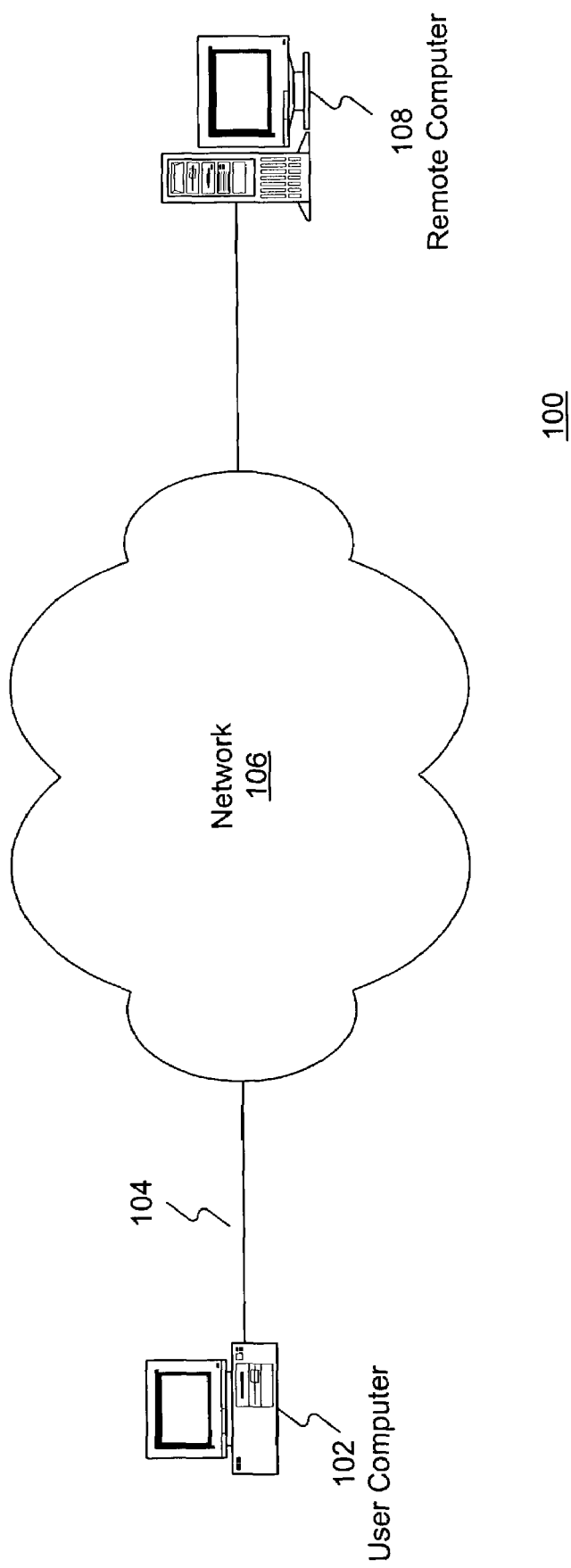
FIG. 1 illustrates a system consistent with the principles of the present invention.

FIG. 1 illustrates a system 100 consistent with the principles of the present invention. As shown, system 100 may include a user computer 102, a network connection 104, a network 106, and a remote computer 108.

User computer 102 may be any processing device for use by a user or person. For example, in one embodiment, user computer 102 is implemented as a personal computer having an Intel Pentium™ processor and the Microsoft™ Windows operating system. User computer 102 may also include a random access memory (RAM), a hard disk drive, a compact disk drive, a floppy disk drive, a monitor, a mouse, a keyboard, and a network interface. However, user computer 102 may be implemented using any combination of software and hardware consistent with the principles of the present invention.

In addition, one skilled in the art would recognize that the user computer 102 may be implemented in other devices, such as a personal digital assistant, a mobile phone, or a cell phone. The principles of the present invention may also be applied to any operating system, including, UNIX, LINUX, and Apple Macintosh™.

Network connection 104 provides connectivity between user computer 102 and network 104. Network connection 104 may be implemented using a variety of connection types, including a digital subscriber line, a dial-up connection, a wireless link, etc. Network connection 104 may include one or more network elements, such as a hub, a router, a switch, or a modem.

Network 106 provides connectivity between user computer 102 and one or more remote computers, such as remote computer 108. For example, in one embodiment, network 106 is the Internet. Network 106 may be implemented using a combination of one or more network elements or one or more interconnected networks. Network 106 may also include a variety of types of networks, such as a local area network or a wide area network.

Remote computer 108 may provide information and data to user computer 102. For example, remote computer 108 may provide information, such as web pages, to user computer 102. In addition, remote computer 108 may support applications, such as games, multimedia applications, electronic mail, file downloads, and instant messaging services.

Although FIG. 1 illustrates one remote computer, system 100 may include a plurality of remote computers. In addition, remote computer 108 may be implemented using any combination of hardware and software or any combination of one or more components.

Figure 2:
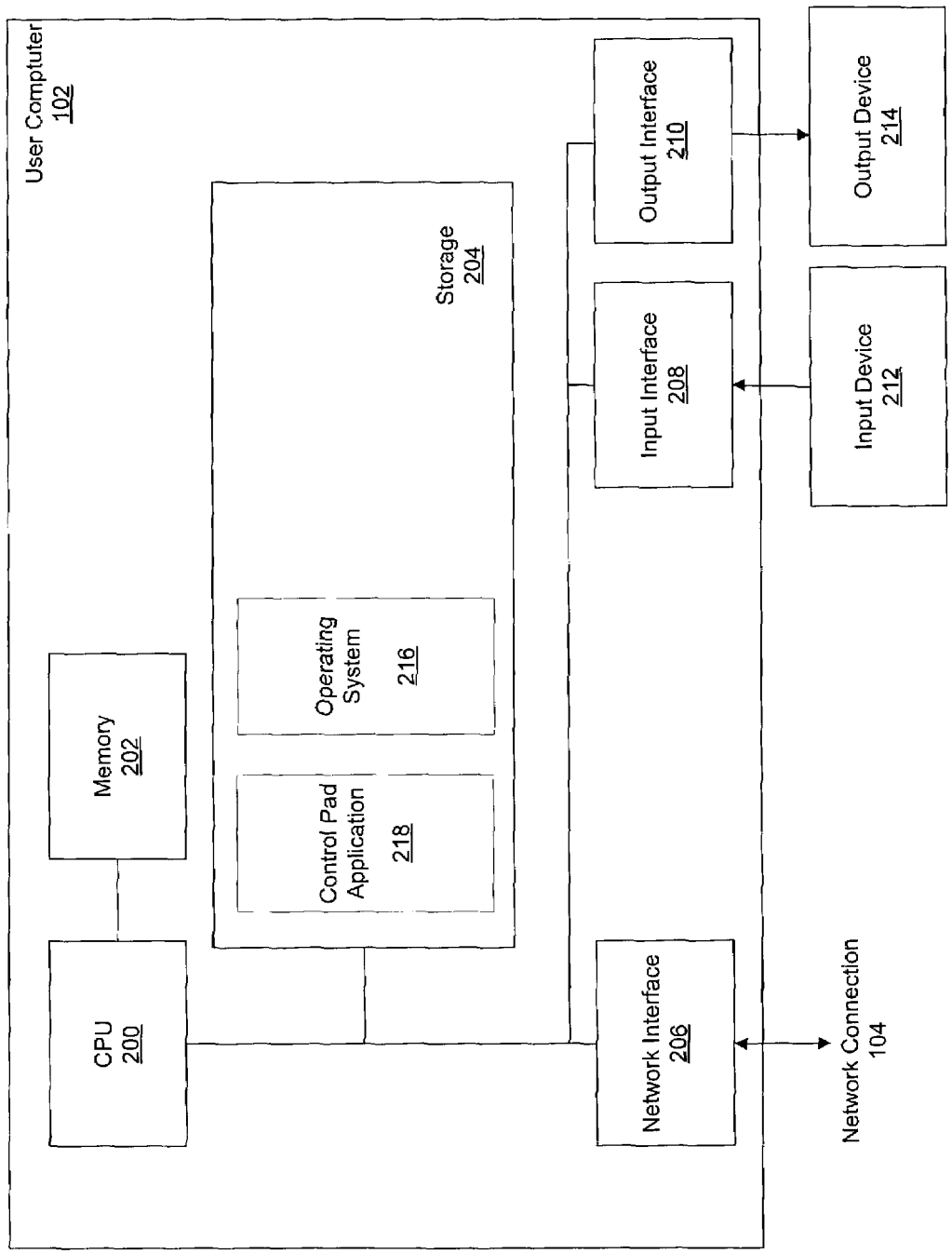
FIG. 2 illustrates a block diagram of a user computer consistent with the principles of the present invention.

FIG. 2 illustrates a block diagram of user computer 102 consistent with the principles of the present invention. As shown, user computer 102 includes a central processing unit (CPU) 200, a memory 202, a storage module 204, a network interface 206, an input interface 208, an output interface 210, an input device 212, and an output device 214.

CPU 200 provides control and processing functions for user computer 102. Although FIG. 2 illustrates a single CPU, user computer 102 may include multiple CPUs. CPU 200 may also include, for example, one or more of the following: a co-processor, memory, registers, and other processing devices and systems as appropriate. For example, CPU 200 may be implemented using a Pentium™ processor provided from Intel Corporation.

Memory 202 provides a primary memory for CPU 200, such as for program code. Memory 202 may be embodied with a variety of components of subsystems, including, a random access memory ("RAM"), and a read-only memory ("ROM"). For example, when user computer 102 executes an application installed in storage module 204, CPU 200 may download at least a portion of the program code from storage module 204 into memory 202. As CPU 200 executes the program code, CPU 200 may also retrieve additional portions of program code from storage module 204.

Storage module 204 provides mass storage for user computer 102. Storage module 204 may be implemented with a variety of components or subsystems including, for example, a hard drive, an optical drive, a general-purpose storage device, a removable storage device, and/or other devices capable of storing information. Further, although storage module 204 is shown within user computer 102, storage module 204 may be implemented using one or more components external to user computer 102.

Storage module 204 may further include program code and information for applications executed via user computer 102. For example, storage module 204 may include program code and information for an operating system 216, such as the Windows operating system, and a control pad application 218. In addition, storage module 204 may include other program code and information (not shown) for other applications such as the Internet Explorer web browser provided by Microsoft Corporation; the Netscape Navigator web browser provided by Netscape Corporation; an electronic mail application, such as Outlook provided by Microsoft Corporation; a multimedia application for playing music, such as an MP3 player or Windows Media player; games, such as Tic-Tac-Toe; and any other software that may be installed on user computer 102.

Network interface 206 provides a communications interface between user computer 102, network connection 104, and network 106. Network interface 206 may receive and transmit communications for user computer 102 via network connection 104. For example, network interface 206 may be a modem, or a local area network ("LAN") port, such as an Ethernet port.

Input interface 208 receives input from input device 212 and provides it to CPU 200. CPU 200 may then interpret the input based on instructions provided by operating system 216. For example, as noted above, operating system 216 may be the Windows operating system, which provides a graphical user interface and allows input device 212 to be a variety of devices, such as a keyboard, a microphone, and a mouse. Other types of input devices may also be implemented consistent with the principles of the present invention.

Output interface 210 provides information to a user (not shown) via output device 214. For example, CPU 200 may execute instructions from operating system 216 to provide a graphical user interface and display information to the user via output device 214. Output device 214 may include, for example, a display, a printer, and a speaker. Other types of output devices may also be implemented consistent with the principles of the present invention.

Control pad application 218 includes program code and information for controlling or interfacing a plurality of applications executed via user computer 102. The plurality of applications controlled by control pad application 218 may include applications for implementing features and functions of control pad application 218, such as an application for an MP3 player, as well as applications other than control pad application 218, such as an electronic mail application. The applications controlled by control pad application 218 may be predetermined, for example, upon installation of control pad application 218 into user computer 102, or may be configured by the user.

Control pad application 218 may be downloaded into storage module 204, for example, from a web page provided by remote computer 108. Control pad application 218 may include program code written, for example, using the Visual Basic programming language. In addition, control pad application 218 may include a variety of other files and information, such as Java program code, dynamic link libraries, Shockwave Flash objects, Hypertext Markup Language (HTML) documents, Active X files, and application extensions.

Upon installation, control pad application 218 may provide instructions to CPU 200 to determine whether user computer 102 meets the minimum requirements for executing control pad application 218, detect any pre-existing versions of control pad application 218, determine which applications will be controlled by control pad application 218, select the files necessary for executing control pad application 218, and select files for storage into storage module 204.

Figure 3:
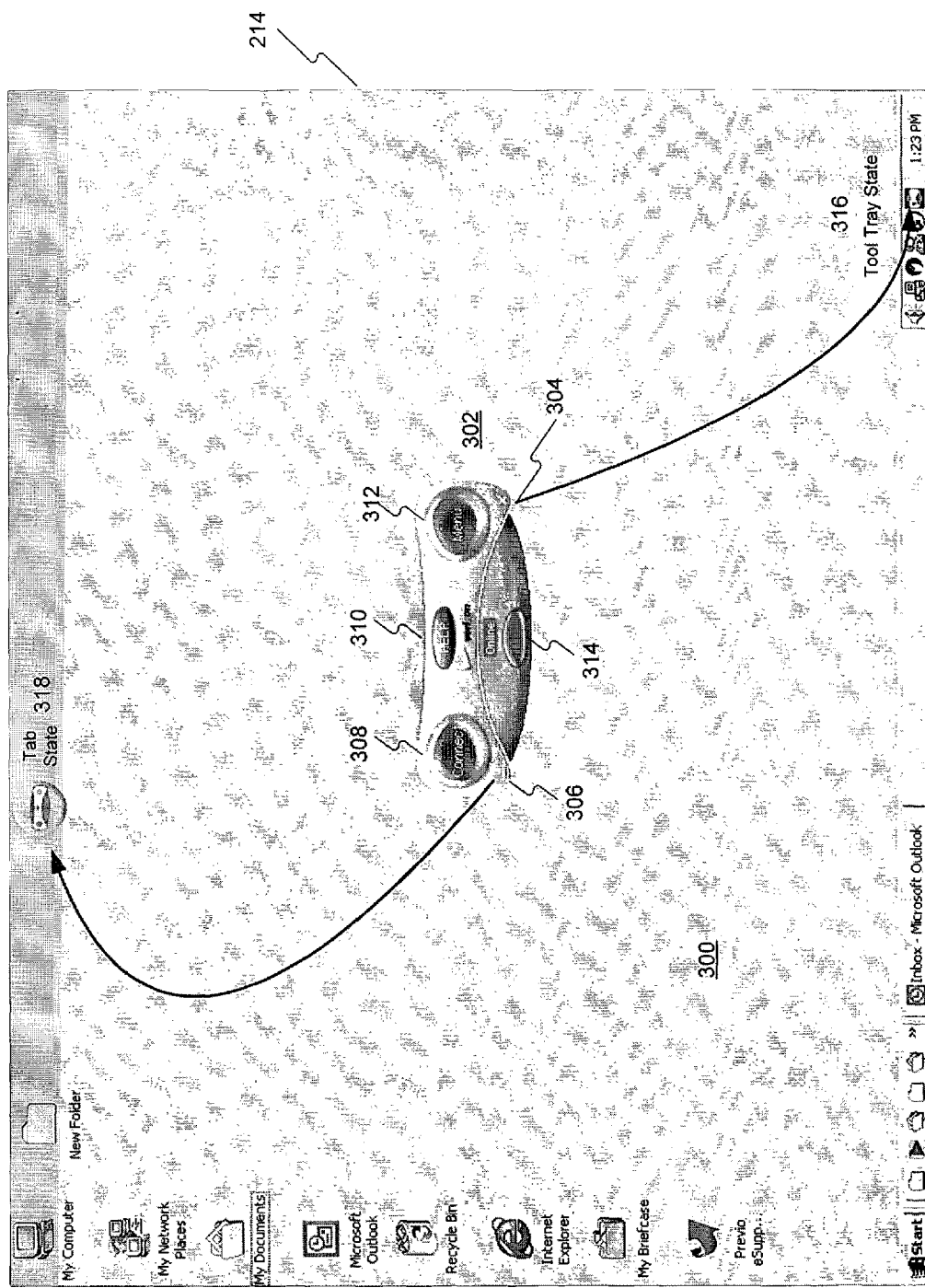
FIG. 3 illustrates icons representing a control pad application, which are displayed by a user computer consistent with the principles of the present invention.

FIG. 3 illustrates icons representing control pad application 218, which are displayed on output device 214 by user computer 102, consistent with the principles of the present invention. As shown, output device 214 displays a desktop area 300 based on instructions from operating system 216. In addition, a control pad icon 302 is displayed, in an expanded state, on desktop area 300. Control pad icon 302 may include areas that are sensitive, for example, to input from the user, such as a button 304 for closing, a button 306 for minimizing, a connect button 308, a help button 310, a menu button 312, and an online button 314.

Button 304 causes control pad icon 302 to close. For example, upon a user clicking button 304, control pad icon 302 may be removed from desktop 300 and tool tray state icon 316 may then appear. Upon a user clicking tool tray state icon 316, control pad icon 302 will then reappear on desktop 300.

Button 306 causes control pad icon 302 to minimize. For example, upon a user clicking button 306, control pad icon 302 may be modified to appear as tab state icon 318. Upon a user clicking tab state icon 318, control pad icon 302 will then reappear.

Connect button 308 causes control pad application 218 to establish a connection over network connection 104. For example, upon clicking button 308 control pad application 218 may provide instructions to CPU 200. CPU 200 may then direct network interface 206 to establish communications over network connection 104, such as a dial-up connection, to network 106.

Help button 310 provides context-sensitive help information for control pad application 218. For example, upon clicking help button 310, control pad application 218 may refer to one or more HTML documents to assist a user. The HTML documents may be stored within storage module 204 or retrieved, for example, from remote computer 108 over network 106.

Menu button 312 causes control pad icon 302 to provide a menu window of applications, which are under the control of control pad application 218. For example, control pad icon 302 may expand to display a menu window of display elements, such as icons, for the applications controlled by control pad application 218. When expanding, control pad icon 302 may be animated, for example, such that the menu window appears to "slide" from control pad icon 302. Other animated effects are also consistent with the principles of the present invention.

Control pad icon 302 may provide controls for applications, such as an auto-update application for self-updating any application on user computer 102 with the latest code; an application for providing diagnostic tools for troubleshooting user computer 102; and an electronic mail check and automatic notification application. Control pad icon 302 may also provide controls for a personal assistant application to provide links to a website on network 104, a home network application for configuring one or more network elements coupled to computer 102, an application for providing bookmarks for websites and links, and a search application. Other applications may include, for example, an application for managing user preferences, and an application for managing a user's account tools, such as tools for changing a user's passwords, determining system status, configuring a personal Webspace, and forwarding electronic mail.

In addition, control pad icon 302 may control applications that provide connections to information available via network 106, such as news, weather, or sports. Furthermore, control pad icon 302 may control a multimedia player application, such as, an MP3 player; games, such as, Tic-Tac-Toe, Gopher-It, and Memory.

Control pad icon 302 may control an Instant Messenger client, a registration application for assisting users in registering for a service, such as a service for accessing network 106, an application managing personalization and customization settings, a universal authentication application, such that a user may enter one username and password for all authentications, a microbrowser application for advertisements, news, and alerts on desktop 300, a network drive management application for information stored on drives accessible over network 106, and alerts for various conditions of interest to a user, such as notifications for when updates are available. Control pad icon 302 may further include a voice client, for example, for providing voice over a digital subscriber line, an application for setting the appearance of control pad icon 302, and an application for setting buttons, shortcuts to other applications or files by the user. Examples of applications, which can be supported by the control pad are also discussed with reference to FIGS. 5-13. In addition, other applications may also be implemented on the control pad consistent with the principles of the present invention.

Figure 4:
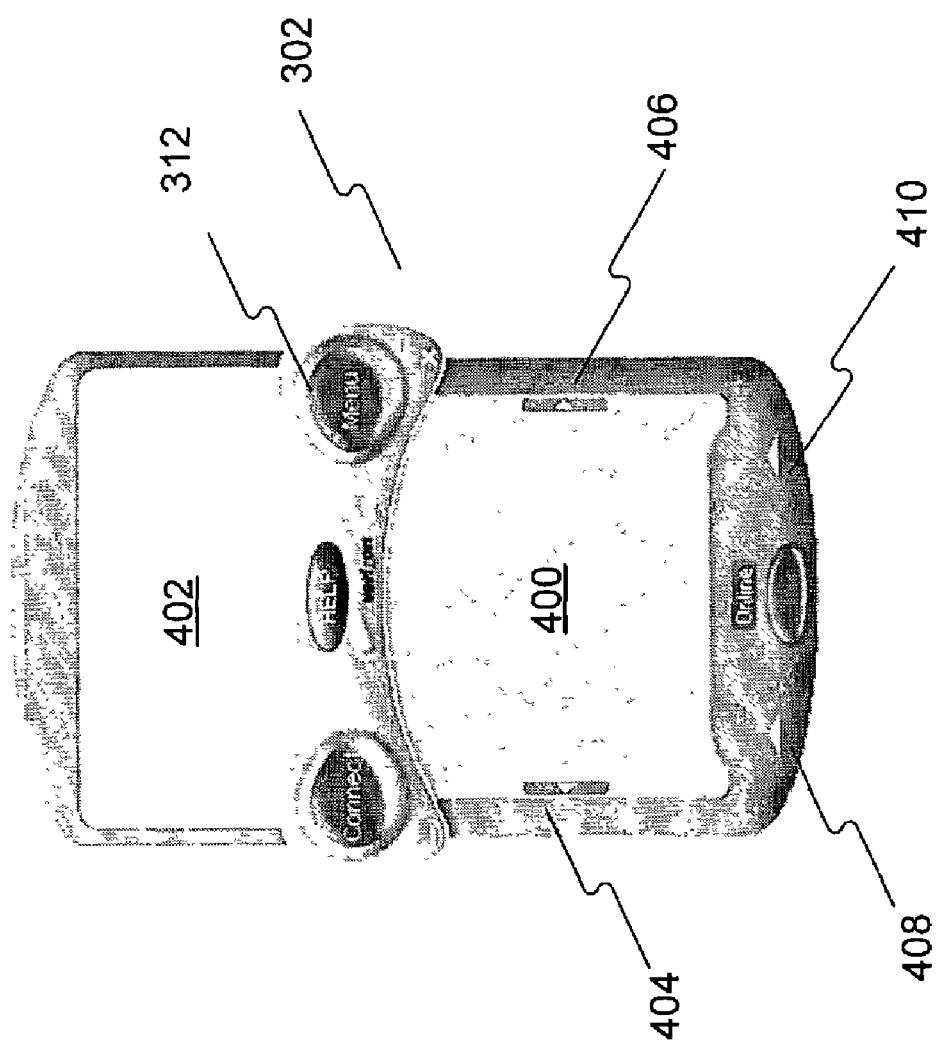
FIG. 4 illustrates the display behavior of the control pad icons consistent with the principles of the present invention.

FIG. 4 illustrates the display behavior of control pad icon 302 consistent with the principles of the present invention. As shown, control pad icon 302 may, for example, expand to provide a menu window 400 and a display window 402. Menu window 400 appears when a user clicks menu button 312. Menu window 400 provides an area for indicating the applications controlled by control pad application 218. In addition, menu window 400 may include navigation buttons 404 and 406 to allow a user to change what is displayed in menu window 400. Furthermore, minimize buttons 408 and 410 allow a user to close menu window 400. Examples of the information displayed in menu window 400 is described with reference to FIGS. 5-13.

Information in display window 402 may be provided based on input from the user within menu window 400. For example, upon a user clicking an icon within menu window 400, control pad icon 302 may expand and show display window 402. When expanding, control pad icon 302 may be animated, for example, such that display window "slides" from control pad icon 302. Other animated effects are also consistent with the principles of the present invention.

Display window 402 provides an area for displaying and maintaining information related to a particular application selected by the user, such as when the user selects an icon within menu window 400. Examples of the information displayed in display window 402 are described with reference to FIGS. 5-13.

Figure 5:
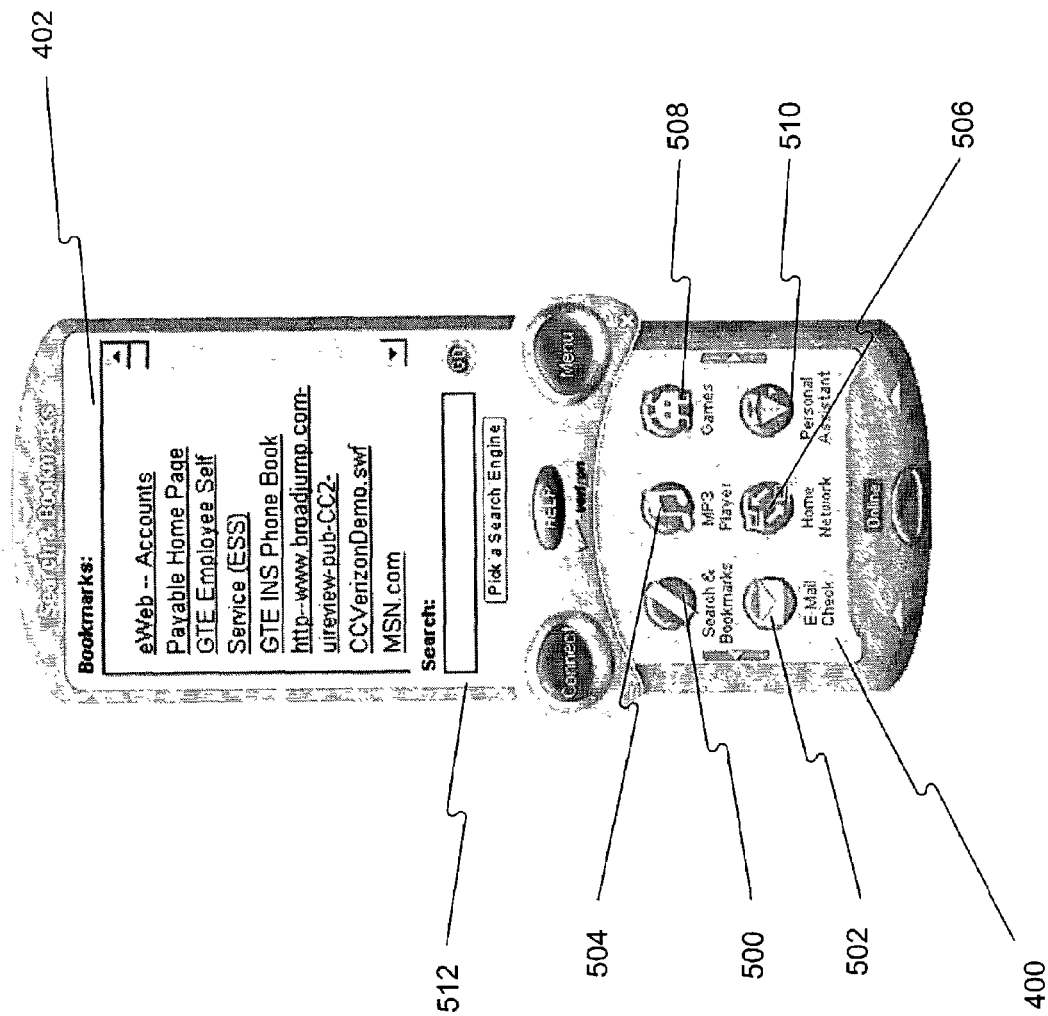
FIG. 5 illustrates an example of an application for bookmarks and search controlled by the control pad application consistent with the principles of the present invention.

FIG. 5 illustrates an example of an application for bookmarks and search controlled by control pad application 218 consistent with the principles of the present invention. As shown, menu window 400 includes icons 500, 502, 504, 506, 508, 510, and 512 to indicate applications controlled by control pad application 218. In addition, upon a user clicking icon 500, display window 402 displays information for the application "Search and Bookmarks."

In particular, display window 402 may include a plurality of uniform resource locators (URLs) for linking to information saved by the user. In addition, display window 402 may also include a search portion 512. Search portion 512 allows the user to enter, for example, key words and search terms for finding information via network 106. In addition, search portion 512 may allow the user to select from one or more search engines, such as Lycos, Yahoo, AltaVista, or InfoSpace. Other types of bookmarks and searches may also be supported by control pad application 218 consistent with the principles of the present invention.

Figure 6:
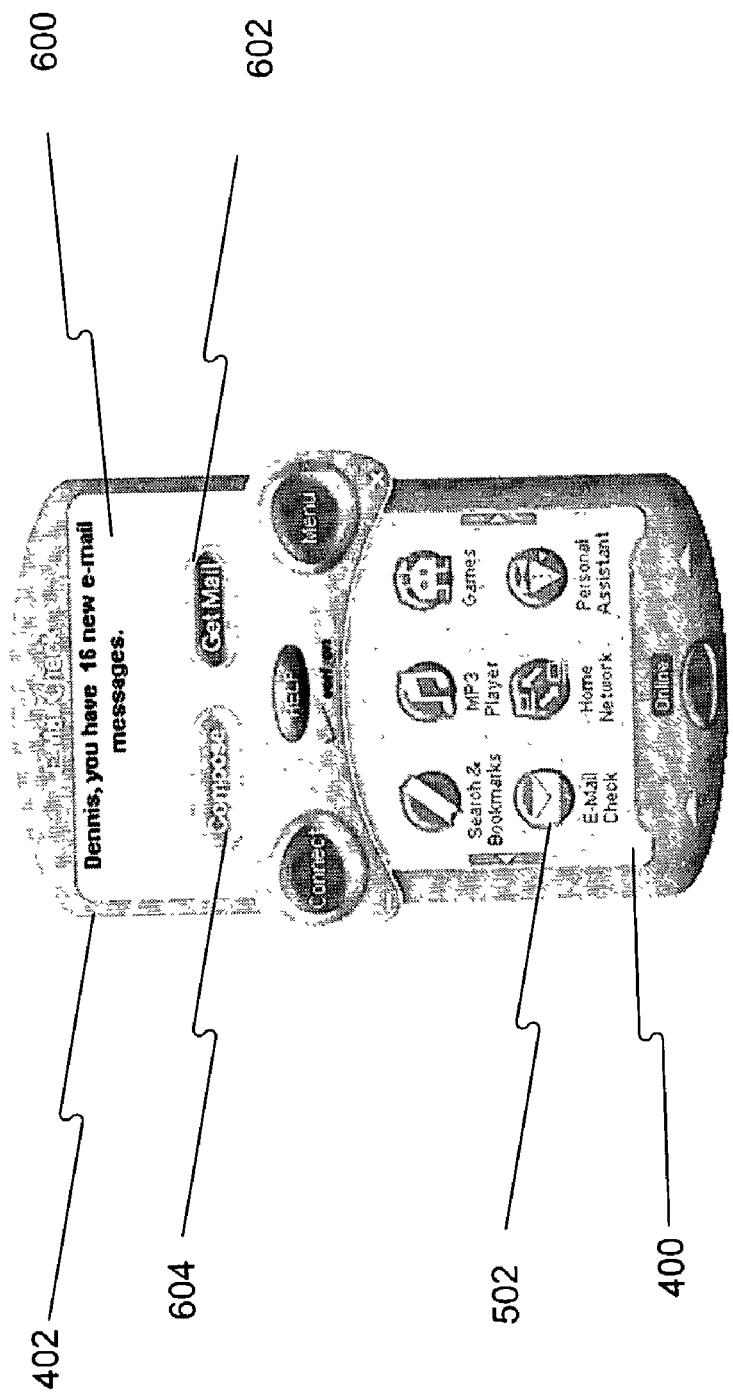
FIG. 6 illustrates an example of an application for electronic mail notification controlled by the control pad application consistent with the principles of the present invention.

FIG. 6 illustrates an example of an application for electronic mail notification controlled by control pad application 218 consistent with the principles of the present invention. As shown, when a user clicks icon 502 in menu window 400, a notification message 600 appears in display window 402. For example, notification message 600 states that "Dennis, you have 16 new e-mail messages."Other types of notification messages are also consistent with the principles of the present invention.

In addition, display window 402 may include a get mail button 602 and a compose button 604. Upon a user clicking get mail button 602, control pad application 218 may launch an electronic mail application, such as Outlook, or Netscape Messenger. The user may then use the electronic mail application to retrieve his mail. Other electronic mail applications may also be controlled by control pad application 218 consistent with the principles of the present invention.

Upon a user clicking compose button 604, control pad application 218 causes the electronic mail application to create a new message. The user may then compose a new mail message using the electronic mail application. Other features of electronic mail, such as sort and delete, in addition to get mail and compose are also consistent with the principles of the present invention.

Figure 6A:
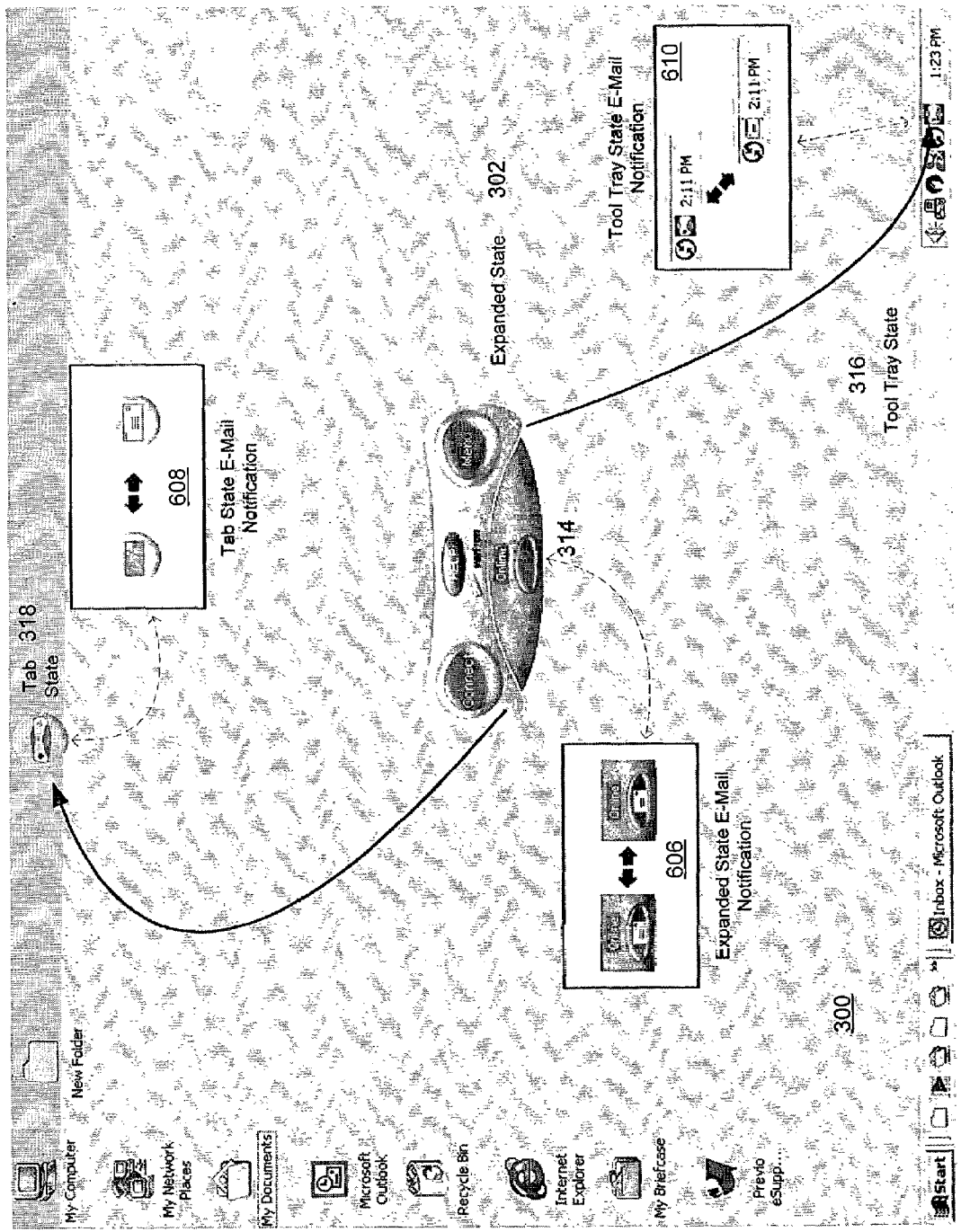
FIG. 6A illustrates another aspect of the application for electronic mail notification controlled by the control pad application consistent with the principles of the present invention.

FIG. 6A illustrates another aspect of the application for electronic mail notification controlled by control pad application 218 consistent with the principles of the present invention. As shown, upon a user receiving a mail message, online button 314 may be modified as indicated in caption 606. In addition, tool tray state icon 316 and tab state icon 318 may be modified as indicated in captions 608 and 610, respectively, to indicate that the user has received a new mail message. Other ways of modifying icons 302, 316 and 318, such as, changing of color, and highlighting, are also consistent with the principles of the present invention.

Figure 7:
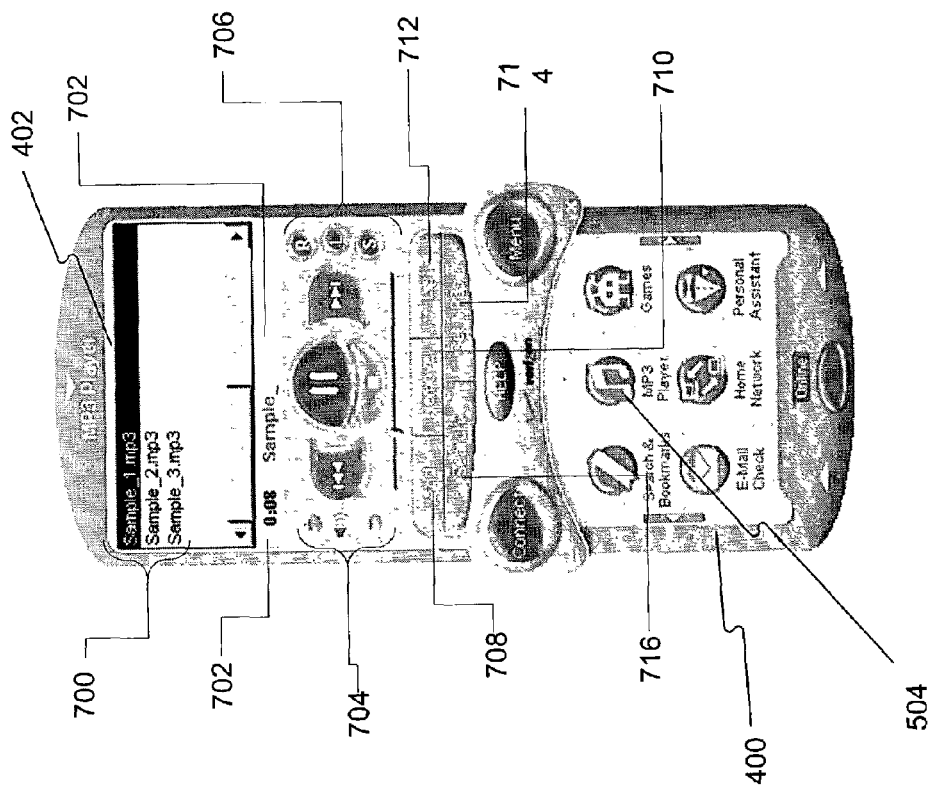
FIG. 7 illustrates an example of a MP3 player application controlled by the control pad application consistent with the principles of the present invention.

FIG. 7 illustrates an example of a MP3 player application controlled by control pad application 218 consistent with the principles of the present invention. As shown, when a user clicks icon 504 in menu window 400, display window 402 displays controls for an MP3 player to play music. For example, display window 402 may include a playlist 700 for listing MP3 files that are currently available, a track status timer 702, a current track title 702, volume control portion 704, playback option control portion 706, an add button 708 for adding an MP3 file, a remove button 710 for removing one or more MP3 files, a list button 712 for requesting MP3 files that are currently available from user computer 102, a get MP3 button 714 for retrieving MP3 files, for example, from remote computer 108, a search button 716 for searching MP3 files stored on user computer 102. Other multimedia applications may also be controlled by control pad application 218 consistent with the principles of the present invention.

Figure 8:
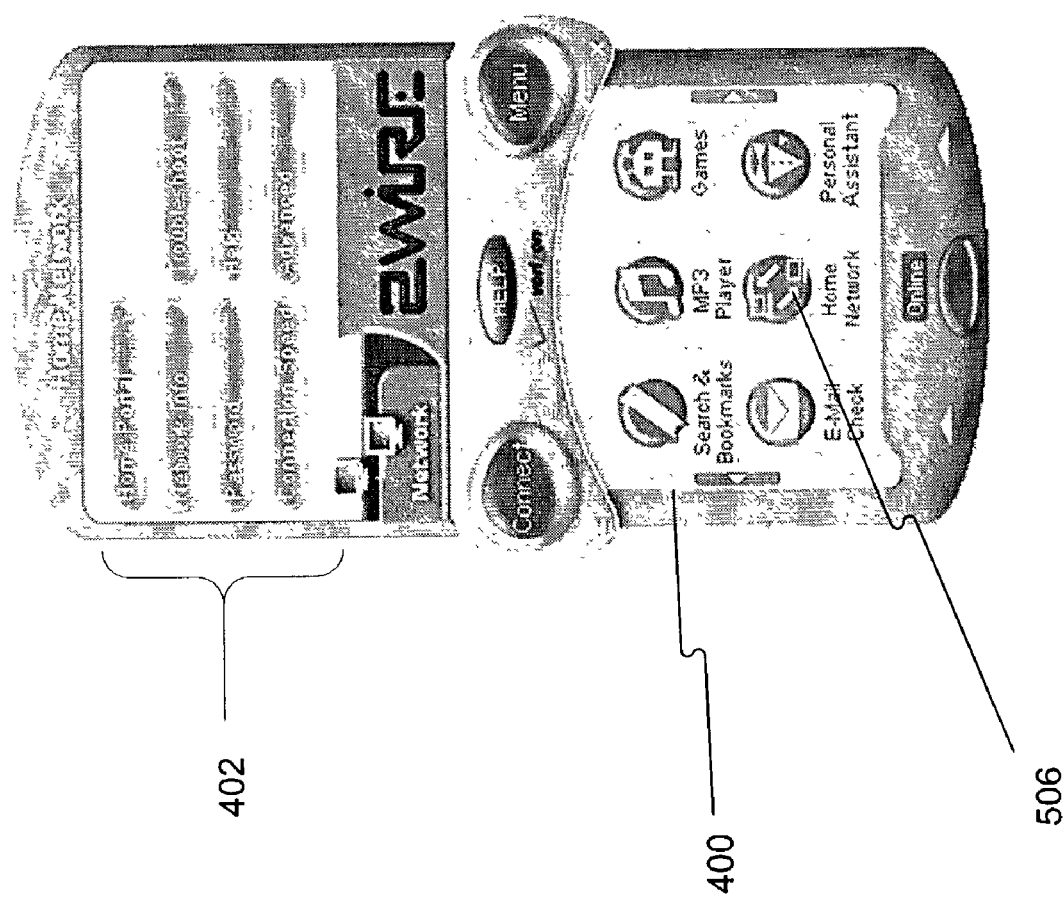
FIG. 8 illustrates an example of a home networking application controlled by the control pad application consistent with the principles of the present invention.

FIG. 8 illustrates an example of a home networking application controlled by control pad application 218 consistent with the principles of the present invention. As shown, when a user clicks icon 506 in menu window 400, display window 402 provides information for configuring one or more network elements, such as a 2-Wire Home Portal device coupled to user computer 102. For example, display window 402 may display HTML links for pages to configure the 2-Wire Portal Device, retrieve network information for user computer 102, retrieve a password associated with user computer 102, determine a connection speed for network connection 104, troubleshoot network connection 104 and any network elements or devices coupled to user computer 102, retrieve help information, and configure advanced settings for user computer 102.

Figure 9:
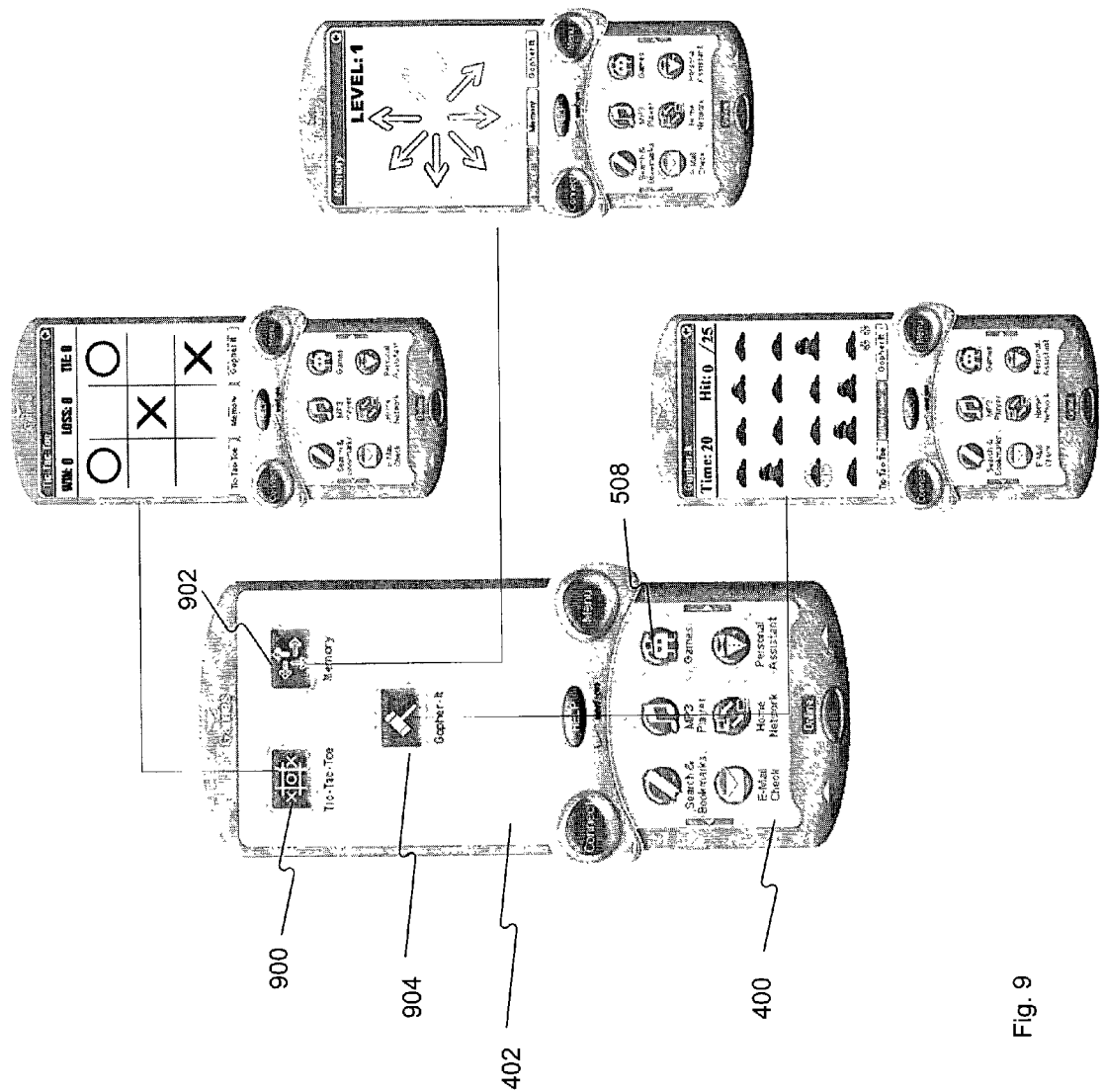
FIG. 9 illustrates examples of games controlled by the control pad application consistent with the principles of the present invention.

FIG. 9 illustrates examples of games controlled by control pad application 218 consistent with the principles of the present invention. As shown, when a user clicks icon 508 in menu window 400, display window 402 displays icons 900, 902, and 904 for Tic-Tac-Toe, Memory, and Gopher-It, respectively. Upon a user clicking icon 900 for Tic-Tac-Toe, display window 402 then provides appropriate images for Tic-Tac-Toe. Likewise, when a user clicks icons 902 and 904, display window 402 provides images for Memory and Gopher-It, respectively. Other games may also be controlled by control pad application 218 consistent with the principles of the present invention.

Figure 10:
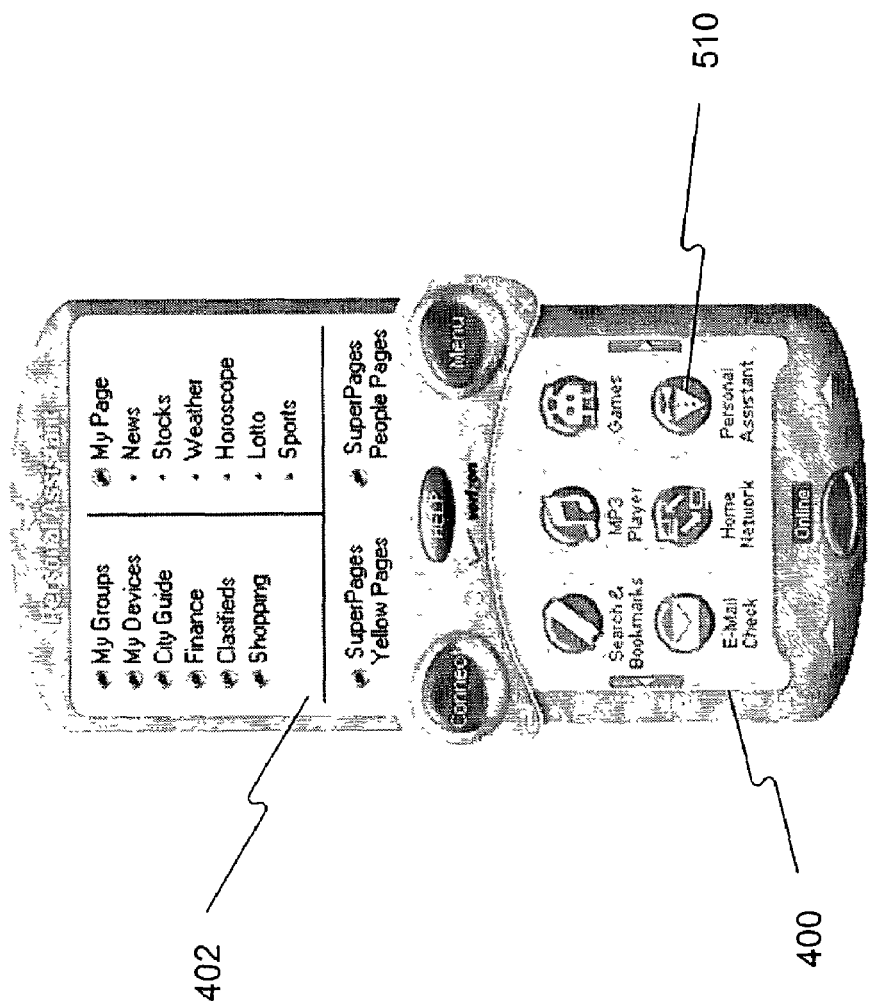
FIG. 10 illustrates an example of a Personal Assistant application controlled by the control pad application consistent with the principles of the present invention.

FIG. 10 illustrates an example of a Personal Assistant application controlled by control pad application 218 consistent with the principles of the present invention. As shown, upon clicking icon 510 in menu window 400, display window 402 displays various URLs that are associated with a user. For example, the user may have URLs for various categories, such as "My Groups," "My Devices," "City Guide," "Finance," "Classified," "Shopping," etc., a SuperPages™ Yellow Pages URL, a SuperPages™ People Pages URL, and a "My Page" URL for one or more pages which are customized by the user. Other types of information in addition to URLs may also be provided by the Personal Assistant application, consistent with the principles of the present invention.

Figure 11:
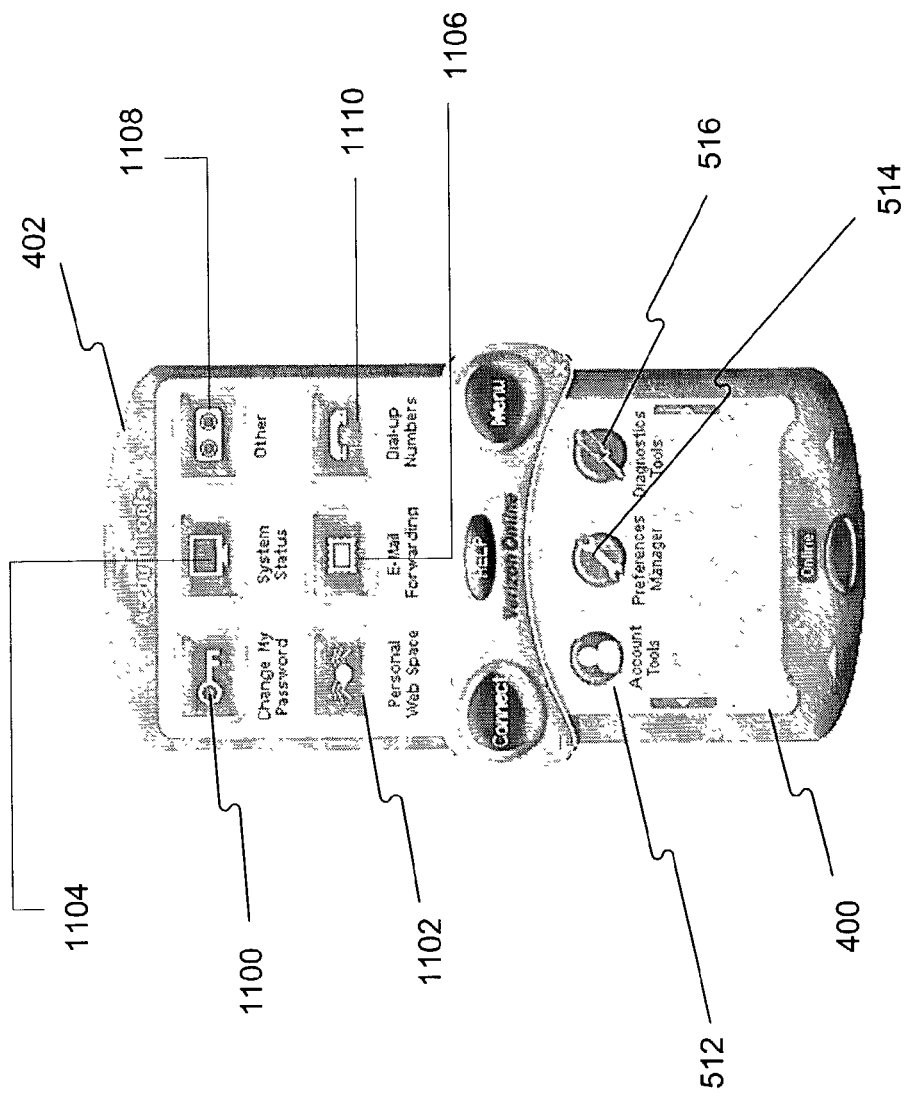
FIG. 11 illustrates an example of an Account Tools application controlled by the control pad application 218 consistent with the principles of the present invention.

FIG. 11 illustrates an example of an Account Tools application controlled by control pad application 218 consistent with the principles of the present invention. As shown, when a user clicks an icon 512 for "Account Tools" in menu window 400, display window 402 may display various icons to allow the user to configure aspects of the user's account, for example, with a service provider for network 106. In one embodiment, display window 402 displays icons 1100, 1102, 1104, 1106, 1108, and 1110, respectively for changing one or more passwords; configuring a personal web space for the user; providing a URL for retrieving a system status of user computer 102; providing a URL for forwarding electronic mail messages; providing a URL for setting other account tools; and providing a URL for retrieving a dial-up numbers, for example, to connect to network 106. Other configuration settings associated with a user's account, such as display settings, fonts, and icon size, may also controlled by control pad application 218 consistent with the principles of the present invention.

Figure 12:
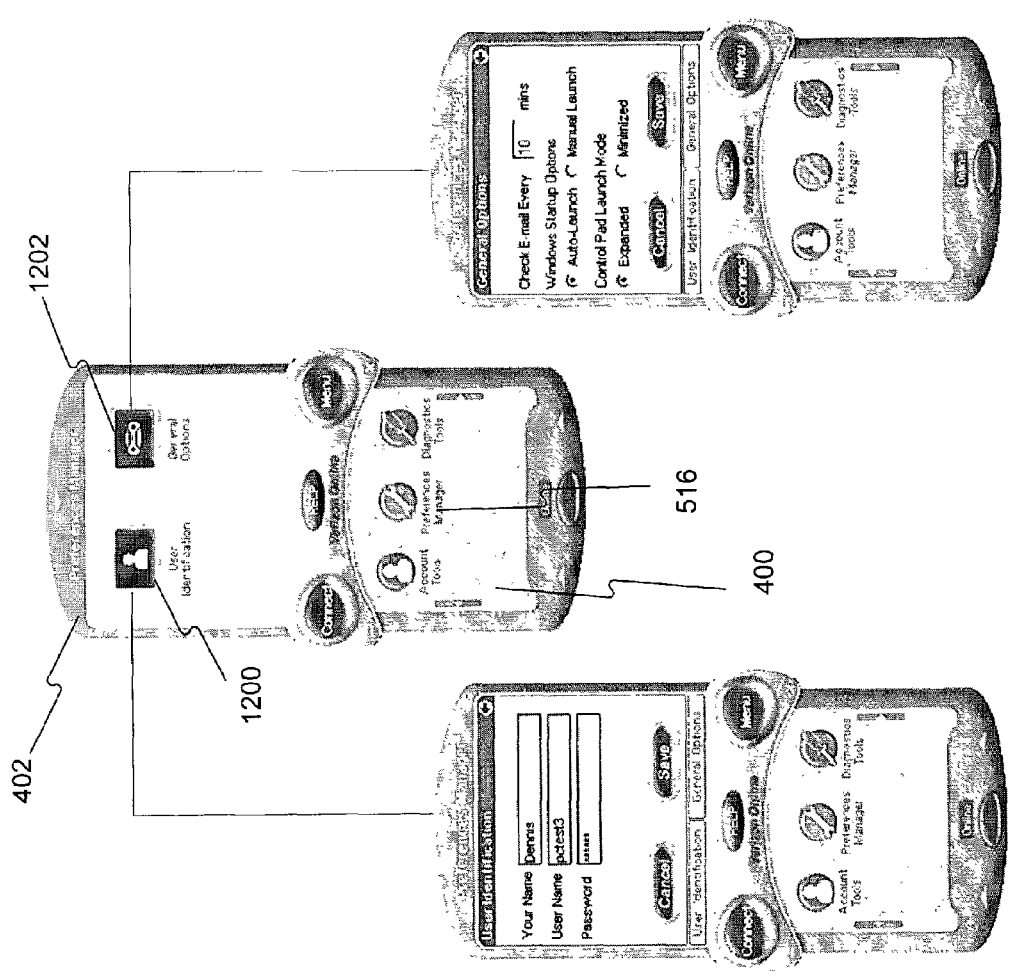
FIG. 12 illustrates an example of a Preferences Manager application controlled by the control pad application consistent with the principles of the present invention.

FIG. 12 illustrates an example of a Preferences Manager application controlled by control pad application 218 consistent with the principles of the present invention. As shown, when a user clicks an icon 516 for "Preferences Manager" in menu window 400, display window may display an icon 1200 for configuring a user's identification and an icon 1202 for setting general options. When a user clicks icon 1200, display window 402 may then display one or more fields for the user to enter and save information, such as a name, a user name, and a password. When a user clicks icon 1202, display window 402 may display information related to general options for control pad application 218, such as an interval for checking electronic mail delivery, options for starting up upon, and options for displaying control pad icon 302. Other preference settings may also be controlled by control pad application 218 consistent with the principles of the present invention.

Figure 13:
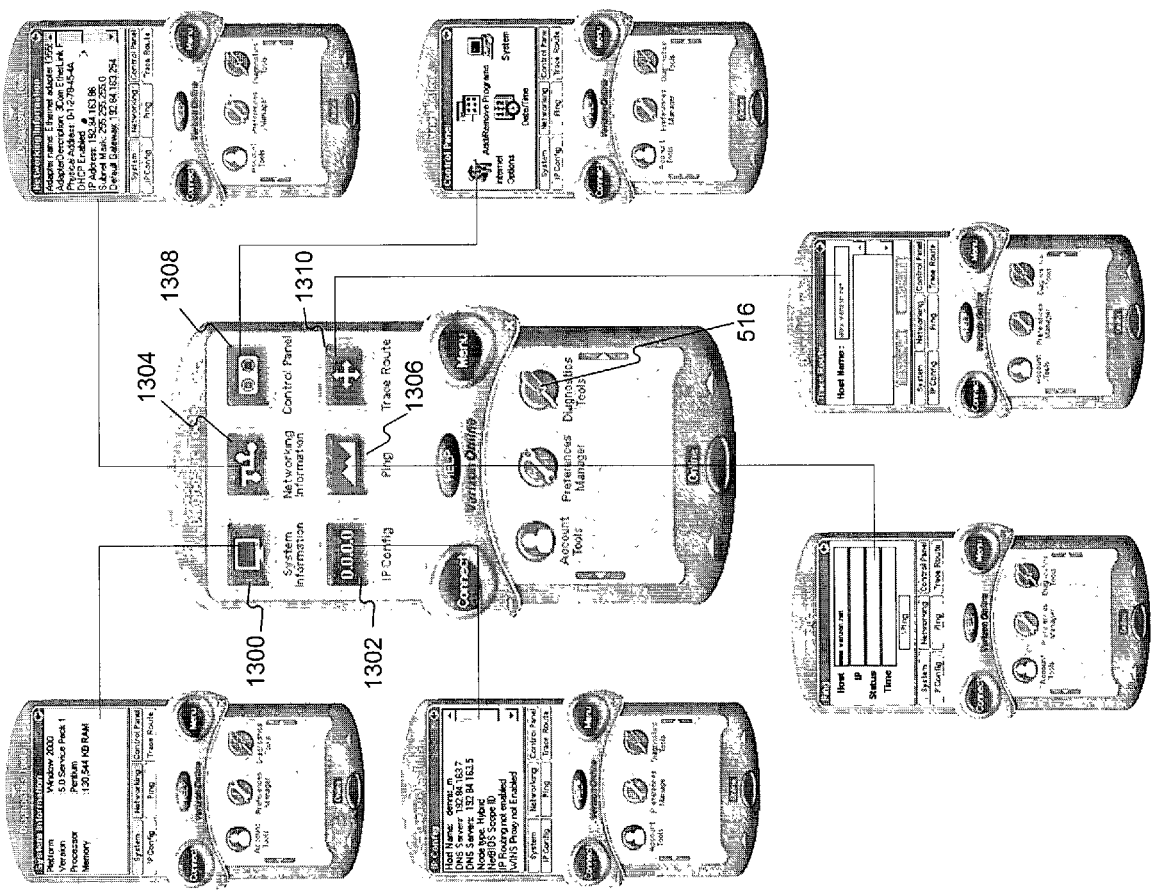
FIG. 13 illustrates an example of a Diagnostic Tools application controlled by the control pad application consistent with the principles of the present invention.

FIG. 13 illustrates an example of a Diagnostic Tools application controlled by control pad application 218 consistent with the principles of the present invention. As shown, when a user clicks an icon 516 for "Diagnostic Tools" in menu window 400, display window 402 displays icons 1300, 1302, 1304, 1306, 1308, and 1310, respectively for retrieving system information; retrieving a network configuration, such as for Internet Protocol (IP); retrieving network information; conducting a ping test; retrieving control panel settings; and conducting a trace route test.

For example, when a user clicks icon 1300, display window 402 may then display system information, such as platform information, version information, processor information, and memory for user computer 102. When a user clicks icon 1302, display window 402 may display IP configuration information, such as name for a host, addresses for domain name servers (DNS), a node type for user computer 102, identification for NetBIOS scope, whether IP routing is configured, and whether a proxy is enabled.

When a user clicks icon 1304, display window may display network information for user computer 102, such as a name and description for an adapter in network interface 206, a physical address for user computer 102, whether dynamic host configuration protocol is enabled, an IP address for user computer 102, a subnet mask for user computer 102, and an address for a default gateway for user computer 102. When a user clicks icon 1306, display window may display information for conducting a ping test, such as a name of a host, an IP address, a status of the ping test, and a time for the ping test.

When a user clicks icon 1308, display window 402 may display information, such as icons for setting Internet options, adding or removing programs, setting a date and time for user computer 102, and setting other systems parameters for user computer 102. When a user clicks icon 1310, display window may display information for conducting a trace route, such as a name for host, and a window for indicating the route between user computer 102 and the host. Other trouble shooting tools may also be controlled the control pad consistent with the principles of the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of controlling a plurality of applications on a computer having a graphical user interface using a control application installed in addition to an operating system of the computer, comprising:

displaying an object, representing the control application and having a first sensitive area, within the graphical user interface;

receiving a first user input at the first sensitive area on the object;

sliding, from the object, a first window having a plurality of icons corresponding to the plurality of applications while continuing to display the first sensitive area;

receiving a second user input in the first window corresponding to at least one of the plurality of icons;

sliding, from the object, a second window displaying information associated with the at least one of the plurality of icons while continuing to display the first window; and controlling at least one of the applications based on the second user input, wherein receiving a third user input at a second sensitive area on the object results in the object closing and a tool tray state icon appearing or results in the object minimizing and a tab state icon appearing.

2. A computer-readable storage-type medium capable of configuring a computer to perform method of controlling a plurality of applications on a computer having a graphical user interface using a control application installed in addition to an operating system of the computer, comprising:

program code for displaying an object, representing the control application and having a first sensitive area, within the graphical user interface;

program code for receiving a first user input at the first sensitive area on the object;

program code for sliding, from the object, a first window having a plurality of icons corresponding to the plurality of applications while continuing to display the first sensitive area;

program code for receiving a second user input in the first window corresponding to at least one of the plurality of icons;

program code for sliding, from the object, a second window displaying information associated with the at least one of the plurality of icons white continuing to display the first window;

program code for controlling at least one of the applications based on the second user input, and program code for receiving a third user input at a second sensitive area on the object which results in the object closing and a tool tray state icon appearing or results in the object minimizing and a tab state icon appearing.

3. A device, comprising:

a display; and a processor interfacing the display based on an operating system and a graphical user interface, and configured to:

display an object, representing a control application installed in addition to the operating system and having a first sensitive area, within the graphical user interface, receive a first user input at the first sensitive area on the object, slide, from the object, a first window having a plurality of icons corresponding to a plurality of applications while continuing to display the first sensitive area, receive a second user input in the first window corresponding to at least one of the plurality of icons, slide, from the object, a second window displaying information associated with the at least one of the plurality of icons while continuing to display the first window, control at least one of the applications based on the second user input; and receive a second user input at a third sensitive area on the object which results in the object closing and a tool tray state icon appearing or results in the object minimizing and a tab state icon appearing.

* * * * *